W. S. HAMM.
BAGGAGE RACK.
APPLICATION FILED APR. 9, 1910.
994,839.
Patented June 13, 1911.
2 SHEETS—SHEET 1.
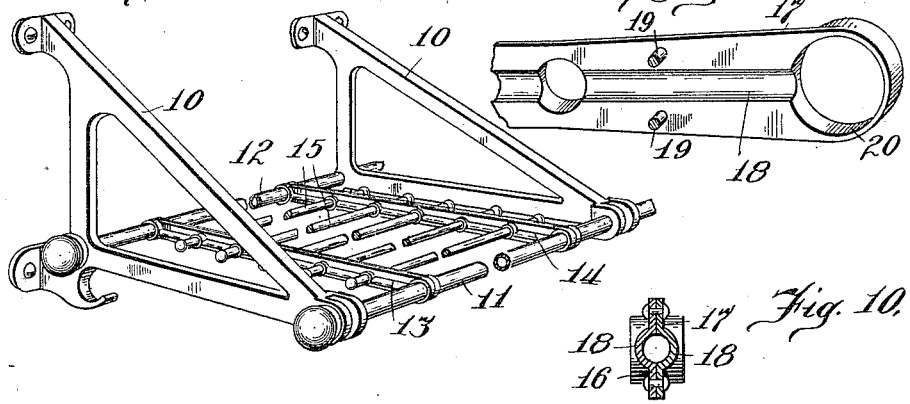
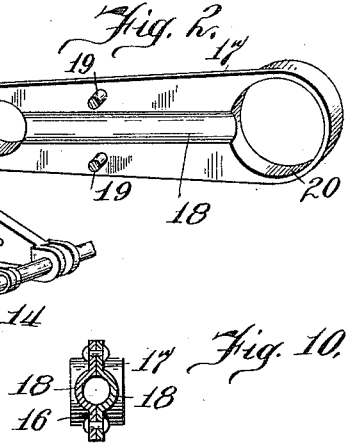
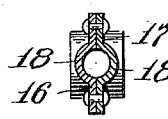
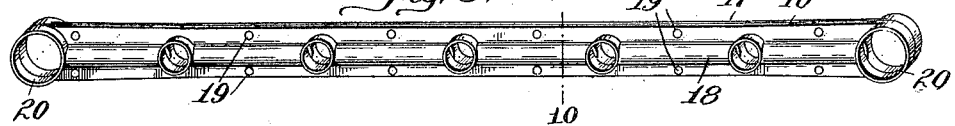
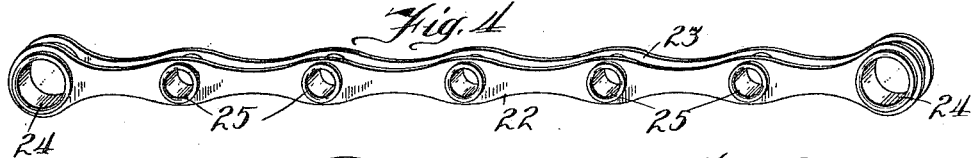
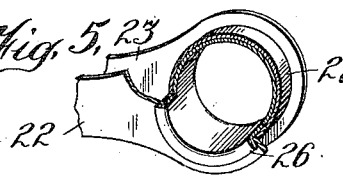
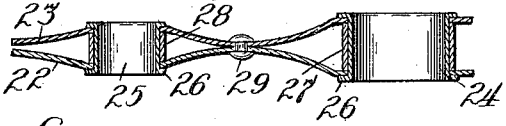
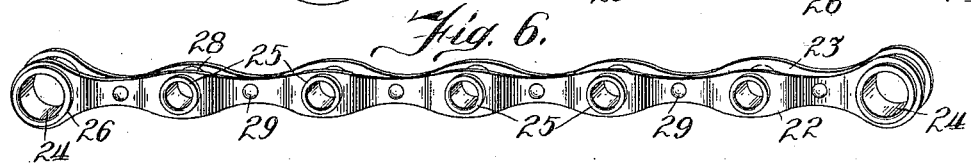
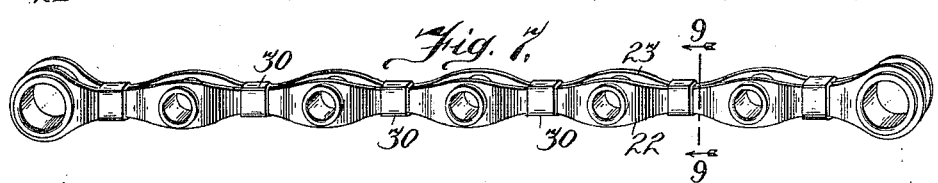

W. S. HAMM.
BAGGAGE RACK.
APPLICATION FILED APR. 9, 1910.
994,839.
Patented June 13, 1911.
2 SHEETS—SHEET 2.
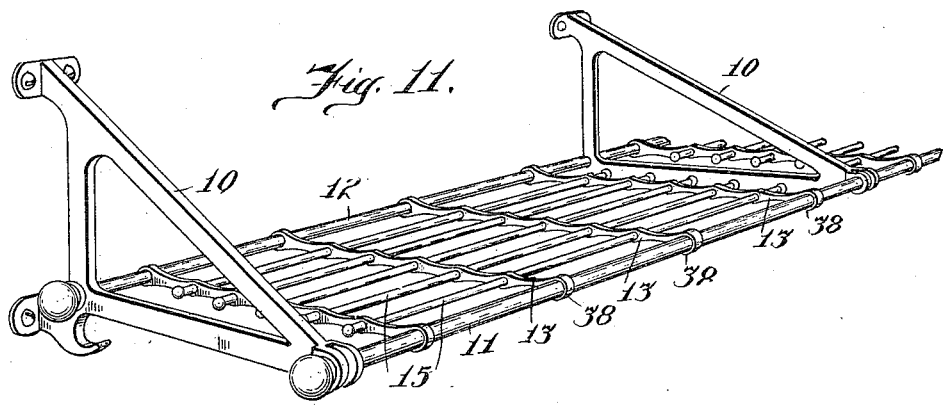
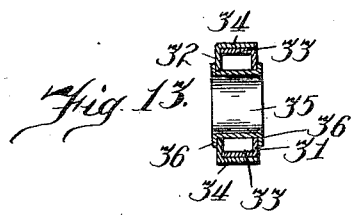
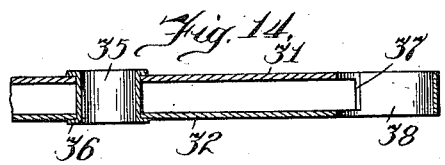
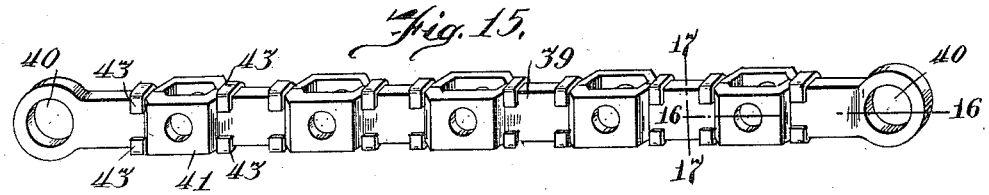
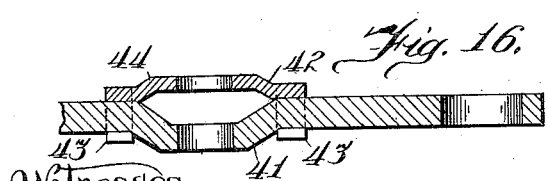
Witnesses
Milton Lenoir
J. S. Young
Inventor
William S. Hamm
by Gillson & Gillson
Attorneys.

UNITED STATES PATENT OFFICE.

WILLIAM S. HAMM, OF HUBBARD WOODS, ILLINOIS, ASSIGNOR TO THE ADAMS & WESTLAKE COMPANY, A CORPORATION OF ILLINOIS.

BAGGAGE-RACK.

994,839.    Specification of Letters Patent.    Patented June 13, 1911.

Application filed April 9, 1910. Serial No. 554,478.

*To all whom it may concern:*

Be it known that I, WILLIAM S. HAMM, a citizen of the United States, and resident of Hubbard Woods, county of Cook, and State of Illinois, have invented certain new and useful Improvements in Baggage-Racks, of which the following is a specification and which are illustrated in the accompanying drawings, forming a part thereof.

The invention relates to racks adapted to be secured to the walls of cars for carrying hand baggage, etc. Its objects are to simplify, cheapen and generally improve the construction of devices of this character, while maintaining ample strength.

The invention consists of a device such as is hereinafter described and illustrated in the accompanying drawings, in which—

Figure 1 is a detail perspective of a baggage rack embodying the invention; Fig. 2 is a detail in perspective of a portion of one of the cross-ribs; Fig. 3 is a perspective of the rib shown in Figs. 1 and 2; Fig. 4 is a perspective of a modified form of rib; Fig. 5 is a detail, partly in section, of the end of the rib shown in Fig. 4; Figs. 6 and 7 are perspective views of the ribs showing a further modification; Fig. 8 is a detail longitudinal plan section of the rib shown in Fig. 6; Figs. 9 and 10 are sectional views taken on the lines 9—9 of Fig. 7 and 10—10 of Fig. 3, respectively; Fig. 11 is similar to Fig. 1, but shows a modified form of construction; Fig. 12 is a perspective view showing one of the cross ribs used in the construction illustrated in Fig. 11; Figs. 13 and 14 are sectional views taken on the lines 13—13 and 14—14 of Fig. 12; Fig. 15 is a perspective view showing another form of cross rib; and Figs. 16 and 17 are sectional views taken on the lines 16—16 and 17—17 of Fig. 15.

The rack comprises a pair of wall brackets designated by the numeral 10; a pair of frame rods 11, 12, which unite the brackets and form the front and rear edges of the grid of the rack; cross-ribs, as 13, 14, as numerous as may be required, uniting the rods 11 and 12; and intermediate rods, as 15, carried by the ribs. The invention pertains more particularly to the ribs used in racks, and in the form of construction illustrated in Figs. 1, 2 and 3 these ribs are each composed of a pair of plates 16, 17, longitudinally ribbed along their median lines, as shown at 18, to give them increased rigidity, and placed face to face and riveted together, as shown at 19.

Each plate has hollow bosses drawn up on its outer face, a large one, as 20, at each end, and smaller ones, as 21, intermediate of its ends, the bosses being so disposed that those of the two plates register when the plates are secured together and form tubular apertures for the reception of the rods 11, 12 and 15.

In the construction illustrated in Fig. 4, the rib is composed of a pair of plates 22, 23, provided with apertures for the accommodation of the rods and secured together by means of thimbles 24, 25, set through these apertures and upset at their outer ends, as more plainly shown at 26 in Figs. 5 and 8. Spacing ferrules 27, 28, are mounted upon the thimbles, the opposite ends of the latter forcing the plates firmly against the ends thereof.

In the construction illustrated in Figs. 6, 7 and 8, the plates 22, 23, are drawn together intermediate of the thimbles, and secured to each other by means of rivets 29, as shown in Figs. 6 and 8, or by means of clips 30, as shown in Fig. 7. When thus formed the ribs are stiffened laterally, the bowed portions having a truss effect.

A common characteristic of all of the modifications is that the plates of which the ribs are formed are vertical, the rod apertures extending through their flat faces. The ribs and rods may be held in fixed engagement by any suitable means, preferably by pinching the tubular portions of the ribs down upon the rods.

In the form of construction illustrated in Figs. 11 to 14 inclusive, the cross ribs 13 are each composed of a pair of plates 31, 32, having flanges 33, 34, extending along their upper and lower edges, the plate 32 being just enough wider than the plate 31 to permit its flanges 34 to overlap the flanges 33 of the plate 31. These plates are provided with registering apertures for receiving the rods 15 of the rack, and are connected by thimbles 35 set through such apertures. The spacing of the plates 31, 32, is determined by the width of the flanges 33, which bear against the face of the plate 32, and the plates are firmly secured together, forming a substantially closed tubular structure, by upsetting the ends of the thimbles 35 upon the outside faces of the plates, as most clearly shown at 36, Figs. 13 and 14. Preferably the plate 31 terminates short of the ends of the plate 32, as shown at 37 (Fig. 14), and apertures 38 are provided at the ends of the rib in the plate 32 only.

In the construction illustrated in Figs. 15, 16 and 17, the ribs 13 are formed principally of a single bar 39 of stout metal, having apertures 40 at its ends for receiving the frame rods 11 and 12. The bar 39 is offset laterally at intervals along its length, as shown at 41 (Figs. 15 and 16), and these offset portions are apertured to receive the rods 15. For the purpose of strengthening the ribs 13 and providing a more substantial bearing therein for the rods 15, short sections of sheet metal 42 are applied to the side of the bar 39 in line with each of its offset portions 41. The members 42 have apertures registering with the rod apertures of the bar 39, and are secured to the bar by means of lugs 43 preferably formed integral with them adjacent their several corners and folded over upon the bar 39. As shown at 44, intermediate portions of the members 42 are offset laterally in line with the offset portions 41 of the bars 39, to impart to the ribs 13 a substantially symmetrical appearance and to provide a wide bearing for the rods 15.

I claim as my invention—

1. In a baggage rack, in combination, a pair of wall brackets, rods uniting the brackets, ribs uniting the rods and each comprising a plurality of vertical sheet metal plates secured together and having transverse horizontal tubular apertures for inclosing the rods and transverse tubular apertures intermediate of their ends, such tubes being formed of sheet metal and rods secured in the last-named rib apertures.

2. In a baggage rack, in combination, a pair of wall brackets, rods uniting the brackets, ribs uniting the rods and each comprising a pair of vertical sheet metal plates secured together, each plate having a plurality of integral lateral nipples, the nipples of the two plates being in register and forming tubular apertures, and intermediate rods, the various rods passing through the rib apertures.

3. In a baggage rack, in combination, a pair of wall brackets, rods uniting the brackets, ribs uniting the rods and each comprising a plurality of vertical sheet metal plates secured together by means of clips and having transverse horizontal tubular apertures for inclosing the rods and transverse tubular apertures intermediate of their ends, and rods secured in the last-named rib apertures.

4. In a baggage rack, in combination, a pair of wall brackets, rods uniting the brackets, ribs uniting the rods and each comprising a plurality of longitudinally ribbed vertical plates secured together and having transverse horizontal tubular apertures for inclosing the rods and transverse tubular apertures intermediate of their ends, and rods secured in the last named rib apertures.

WILLIAM S. HAMM.

Witnesses:
LOUIS K. GILLSON,
E. M. KLATCHER.

---

Copies of this patent may be obtained for five cents each, by addressing the "Commissioner of Patents, Washington, D. C."